United States Patent
Ujimoto et al.

(10) Patent No.: US 12,440,429 B2
(45) Date of Patent: Oct. 14, 2025

(54) WATER-IN-OIL EMULSION COSMETIC PREPARATION FOR SKIN

(71) Applicant: Shiseido Company, Ltd., Tokyo (JP)

(72) Inventors: Kei Ujimoto, Tokyo (JP); Takumi Kurashima, Tokyo (JP); Momoka Kojiri, Tokyo (JP); Keita Nishida, Tokyo (JP); Toshihiko Matsukura, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 583 days.

(21) Appl. No.: 17/788,565

(22) PCT Filed: Dec. 10, 2020

(86) PCT No.: PCT/JP2020/045950
§ 371 (c)(1),
(2) Date: Jun. 23, 2022

(87) PCT Pub. No.: WO2021/131720
PCT Pub. Date: Jul. 1, 2021

(65) Prior Publication Data
US 2023/0050910 A1      Feb. 16, 2023

(30) Foreign Application Priority Data

Dec. 24, 2019   (JP) ................. 2019-233178

(51) Int. Cl.
*A61K 8/06* (2006.01)
*A61K 8/89* (2006.01)
*A61Q 17/04* (2006.01)

(52) U.S. Cl.
CPC ............ *A61K 8/064* (2013.01); *A61K 8/89* (2013.01); *A61Q 17/04* (2013.01)

(58) Field of Classification Search
None
See application file for complete search history.

(56) References Cited

U.S. PATENT DOCUMENTS

| | | |
|---|---|---|
| 2009/0092242 A1 | 4/2009 | Cooke et al. |
| 2010/0291011 A1 | 11/2010 | Ikebe et al. |
| 2010/0310491 A1 | 12/2010 | Falk et al. |
| 2014/0205552 A1 | 7/2014 | Fukuhara |
| 2020/0163847 A1 | 5/2020 | Touati et al. |
| 2022/0071872 A1* | 3/2022 | Johncock ............... A61K 8/062 |

FOREIGN PATENT DOCUMENTS

| | | |
|---|---|---|
| CN | 101951876 A | 1/2011 |
| CN | 103945824 A | 7/2014 |
| EP | 1 618 871 B1 | 1/2006 |
| EP | 2 243 465 A1 | 10/2010 |
| EP | 2 505 182 A1 | 10/2012 |
| EP | 2 559 426 A2 | 2/2013 |
| EP | 3 375 493 A1 | 9/2018 |
| EP | 3 449 902 A1 | 3/2019 |
| JP | 10-194945 A | 7/1998 |
| JP | 2004-224757 A | 8/2004 |
| JP | 2008-019248 A | 1/2008 |
| JP | 2009191033 A * | 8/2009 |
| JP | 2011-503059 A | 1/2011 |
| JP | 2015-083561 A | 4/2015 |
| JP | 2017-066107 A | 4/2017 |
| JP | 2017-132741 A | 8/2017 |
| WO | WO-2016/068300 A1 | 5/2016 |
| WO | WO-2018/225765 A1 | 12/2018 |

OTHER PUBLICATIONS

Dr.Ci:Labo, BB Lip Gloss, 10g, CosDNA, Apr. 30, 2015, 2 pages.
Elegance pump lifting base UV SPF40 PA+++, CosDNA, Oct. 21, 2017, 3 pages.

* cited by examiner

*Primary Examiner* — Nannette Holloman
(74) *Attorney, Agent, or Firm* — Foley & Lardner LLP

(57) ABSTRACT

An objective of the invention is to provide a water-in-oil emulsion skin cosmetic having the property wherein contact with moisture, such as water or perspiration, increases the ultraviolet protection effects over those immediately after application, and also having an excellent feeling in use. The present invention relates to a water-in-oil emulsion skin cosmetic comprising (A) (a-1) a copolymer having silanol groups, and oxypropylene groups (PO) or oxyethylene groups (EO), and/or (a-2) a silylated peptide; and (B) an ultraviolet protectant.

3 Claims, No Drawings

WATER-IN-OIL EMULSION COSMETIC PREPARATION FOR SKIN

CROSS-REFERENCE TO RELATED APPLICATIONS

This application is the U.S. National Stage of PCT/JP2020/045950, filed Dec. 10, 2020, which claims priority to JP 2019-233178, filed Dec. 24, 2019.

TECHNICAL FIELD

The present invention relates to a water-in-oil emulsion skin cosmetic. More specifically, the present invention relates to a water-in-oil emulsion skin cosmetic in which an ultraviolet protectant is blended, wherein contact with moisture such as water or perspiration increases the ultraviolet protection effects over those immediately after application, and also having an excellent feeling in use.

BACKGROUND ART

Protecting the skin from damage due to ultraviolet rays is an important problem in skin care and body care, and various UV-care cosmetics for minimizing the harmful effects of ultraviolet rays on the skin have been developed. Sunscreen cosmetics, which are a type of UV-care cosmetic, are cosmetics that are intended to protect the skin from the harmful effects of ultraviolet rays by covering the skin with a coating film in which an ultraviolet protectant such as an ultraviolet absorbing agent or an ultraviolet scattering agent is blended, thereby absorbing or scattering UVA and UVB rays in solar rays, and limiting the amount of ultraviolet rays that reach the skin (Non-Patent Document 1).

Sunscreen cosmetics that have been applied to the skin are exposed to various types of moisture, such as seawater and perspiration secreted from the skin. Thus, situations in which the ultraviolet absorbing agents or ultraviolet scattering agents flow out from the cosmetic coating film applied to the skin and lower the ultraviolet protection effects cannot be avoided. Therefore, water-in-oil emulsion cosmetics are preferably used for having excellent water resistance.

For example, Patent Document 1 describes that blending an oil phase thickener or the like into a sunscreen cosmetic containing an ultraviolet protectant results in the unique and unprecedented property wherein, after a coating film of the cosmetic has come into contact with moisture such as water or perspiration, the ultraviolet protection effects improve in comparison with those immediately after the cosmetic was applied (before coming into contact with moisture). However, if the cosmetic of Patent Document 1 is prepared as a water-in-oil emulsion cosmetic, then the viscosity of the external phase is raised by blending the oil phase thickener, and there was a tendency for stickiness to occur. Thus, further improvements have been sought, particularly in terms of the feeling in use.

RELATED ART

Patent Documents

Patent Document 1: WO 2016/068300 A

Non-Patent Documents

Non-Patent Document 1: *Shin-keshohingaku*, second edition, edited by Takeo Mitsui, 2001, published by Nanzando, pp. 497-504.

SUMMARY OF THE INVENTION

Problem to be Solved by the Invention

An objective of the present invention is to provide a water-in-oil emulsion skin cosmetic having the property wherein contact with moisture such as water or perspiration increases the ultraviolet protection effects over those immediately after application, and also having an excellent feeling in use.

Means for Solving the Problem

The present inventors performed diligent research towards solving the above-mentioned problem, as a result of which they discovered that, by blending a copolymer having silanol groups and oxypropylene groups (PO) or oxyethylene groups (EO) and/or a silylated peptide into a water-in-oil emulsion skin cosmetic comprising an ultraviolet protectant, the ultraviolet protection effects are significantly improved upon contact with moisture such as water or perspiration, and an excellent feeling in use is obtained. Thus, the present invention was completed.

That is, the present invention provides a water-in-oil emulsion skin cosmetic comprising:
(A) at least one compound selected from among (a-1) copolymers having silanol groups and oxypropylene groups (PO) or oxyethylene groups (EO), and (a-2) silylated peptides; and
(B) an ultraviolet protectant.

Effects of the Invention

By having the above-mentioned features, in the water-in-oil emulsion skin cosmetic of the present invention, the ultraviolet protection performance after coming into contact with water, perspiration or the like is significantly improved over those immediately after the cosmetic was applied to the skin. Additionally, since the ultraviolet protection performance is sufficiently improved by component (A) in the present invention, the blended amount of an oil phase thickener, which was conventionally blended for the purpose of improving the ultraviolet protection performance, can be reduced, allowing a water-in-oil emulsion sunscreen cosmetic lacking stickiness and having an excellent feeling in use to be obtained.

MODES FOR CARRYING OUT THE INVENTION

As mentioned above, the water-in-oil emulsion skin cosmetic (hereinafter sometimes referred to simply as the "cosmetic") of the present invention is characterized by comprising:
(A) (a-1) a copolymer having silanol groups and oxypropylene groups (PO) or oxyethylene groups (EO), and/or
(a-2) a silylated peptide; and
(B) an ultraviolet protectant.

Component (A) in the present invention is at least one compound selected from among (a-1) copolymers having silanol groups and oxypropylene groups (PO) or oxyethylene groups (EO), and (a-2) silylated peptides. The cosmetic of the present invention may contain either of (a-1) or (a-2), or may contain both (a-1) and (a-2).

The (a-1) copolymer having silanol groups and oxypropylene groups (PO) or oxyethylene groups (EO) blended into the cosmetic of the present invention is a copolymer including a polysiloxane structure and a polyoxyalkylene structure on the main chain of the polymer, and having a side chain with trialkoxysilane groups or silanol groups (hereinafter abbreviated to "crosslinked silicone POA copolymer").

The polysiloxane structure constituting the main chain of the (a-1) crosslinked silicone POA copolymer in the present invention comprises a polydialkylsiloxane, preferably polydimethylsiloxane, and some of the alkyl groups (preferably methyl groups) may be substituted with phenyl groups.

The polyoxyalkylene structure constituting the main chain of the (a-1) crosslinked silicone POA copolymer in the present invention preferably includes repeating units of at least one type selected from the group consisting of oxyethylene groups (EO), oxypropylene groups (PO) and oxybutylene groups (BO).

The (a-1) crosslinked silicone POA copolymer in the present invention preferably further has a side chain comprising organic groups. Examples of organic groups that can form the side chain include hydrocarbon groups (preferably alkyl groups, for example, linear or branched alkyl groups having approximately 1 to 30 carbon atoms, phenyl groups and the like), which may be optionally substituted with substituent groups such as amino groups, hydroxyl groups and carboxyl groups. The hydrocarbon groups should preferably have amino groups and the hydrogen atoms in the amino groups may be further substituted by alkyl groups or the like.

The (a-1) crosslinked silicone POA copolymer of the present invention preferably further includes a nitrogen atom in the main chain thereof, and the side chain is preferably bonded to the nitrogen atom.

A more specific example of the (a-1) crosslinked silicone POA copolymer is Polysilicone-29 (INCI name). Polysilicone-29 is defined as a composite silicone compound obtained by a reaction between a dimethylsiloxane polymer terminated by a glycidoxypropyl group, and PEG-13 diglycidyl ether, diethylaminopropylamine and aminopropyltriisopropoxysilane.

A commercially available product may also be used as the (a-1) crosslinked silicone POA copolymer in the cosmetic of the present invention. For example, "Silsoft CLX-E" (manufactured by Momentive Performance Materials) can be favorably used, and this copolymer is a compound that belongs among those referred to as "Polysilicone-29". Said copolymer includes a polysiloxane structure, a polyoxyalkylene structure and nitrogen atoms on the main chain, and has a side chain with a trialkoxysilane group and a side chain comprising an organic group. The polysiloxane structure contains polydimethylsiloxane and the polyoxyalkylene structure includes polyoxyethylene and polyoxyisopropylene. The side chains are bonded to the nitrogen atoms on the main chain. "Silsoft CLX-E" is a product including said copolymer, dipropylene glycol and water.

As the (a-2) silylated peptide blended into the cosmetic of the present invention, one represented by general formula (I) is preferably used.

[Chem. 1]

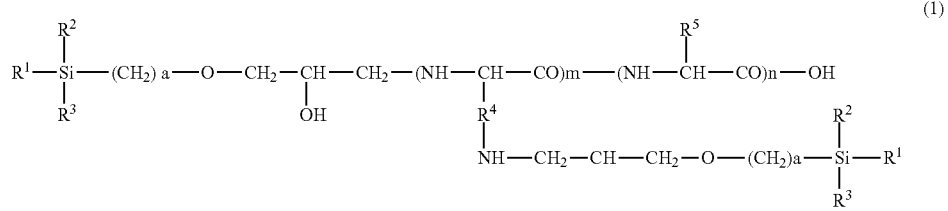

(1)

[In formula (I), $R^1$, $R^2$ and $R^3$ denote alkyl groups having 1 to 3 carbon atoms or hydroxyl groups, wherein $R^1$, $R^2$ and $R^3$ may all be the same or may be different; $R^4$ denotes a residue of a basic amino acid with a side chain terminated by an amino group, wherein the residue lacks the terminated amino group; $R^5$ denotes an amino acid side chain other than $R^4$; a is 1 or 3, m is 0 to 200, n is 0 to 200 and m+n is 1 to 200. (However, m and n only represent the number of amino acids and do not represent the order of the amino acid sequence.)]

The (a-2) silylated peptide represented by general formula (I) is obtained, for example, by means of a condensation reaction between a silyl compound represented by the following general formula (II):

[Chem. 2]

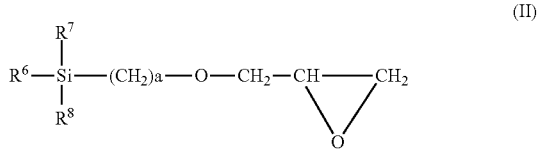

(II)

[In formula (II), $R^6$, $R^7$ and $R^8$ denote alkyl groups having 1 to 3 carbon atoms, alkoxy groups having 1 to 3 carbon atoms, hydroxyl groups or halogen atoms, wherein $R^6$, $R^7$ and $R^8$ may all be the same or may be different; and a denotes 1 or 3.]; and the peptide represented by the following general formula (III):

[Chem. 3]

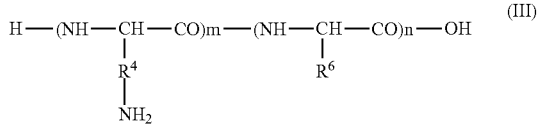

(III)

[In formula (III), $R^4$ denotes a residue of a basic amino acid with a side chain terminated by an amino group, wherein the residue lacks the terminated amino group; $R^5$ denotes an amino acid side chain other than $R^4$; m is 0 to 200, n is 0 to 200 and m+n is 1 to 200.]

In the (a-2) silylated peptide represented by general formula (I) above, $R^4$ denotes a residue of a basic amino acid with a side chain terminated by an amino group, wherein the residue lacks the terminated amino group, and basic amino acids with a side chain terminated by an amino group as mentioned above include, for example, lysine, arginine, hydroxylysine and the like. Additionally, $R^5$ denotes a side chain of an amino acid other than $R^4$, and such amino acids include, for example, glutamic acid, aspartic acid, alanine, serine, threonine, valine, methionine, leucine, isoleucine, tyrosine, phenylalanine, proline, hydroxyproline and the like.

The peptides represented by general formula (III) include amino acids, peptides, and esters of amino acids or peptides. The above-mentioned amino acids include alanine, glycine, valine, leucine, isoleucine, proline, phenylalanine, tyrosine, serine, threonine, methionine, arginine, histidine, lysine, asparagine, aspartic acid, glutamine, glutamic acid, cystine, cysteine, cysteic acid, tryptophan, hydroxyproline, hydroxylysine, O-phosphoserine, citrulline and the like.

The above-mentioned peptides are hydrolyzed peptides obtained by partially hydrolyzing a natural peptide, a synthetic peptide or a protein with an acid, an alkali or an enzyme. Natural peptides include, for example, glutathione, bacitracin A, insulin, glucagon, oxytocin, vasopressin and the like. Synthetic peptides include, for example, polyglycine, polylysine, polyglutamic acid, polyserine and the like. The hydrolyzed peptide may be a peptide obtained by partially hydrolyzing a protein with an acid, an alkali, an enzyme or a combination thereof. Examples of protein sources include animal proteins, vegetable proteins and microbial proteins Animal proteins include, for example, silk, collagen (including gelatin, which is a variant thereof), keratin, fibroin, sericin, casein, conchiolin, elastin, protamine, and egg yolk protein or egg white protein from chickens and the like. Vegetable proteins include proteins contained in soybeans, wheat, rice (rice bran), sesame seeds, peas, corn, tubers and the like. Additionally, microbial proteins include yeast proteins isolated from yeasts in the genus *Saccharomyces*, the genus *Candida* and the genus *Endomycopsis*, and yeasts known as beer yeasts and sake yeasts, and proteins isolated from mushrooms (basidiomycetes), chlorella and the like.

Esters of the above-mentioned amino acids or peptides include esters with hydrocarbon alcohols having 1 to 20 carbon atoms at the carboxyl groups on the amino acids or peptides. Examples include methyl esters, ethyl esters, propyl esters, isopropyl esters, lauryl esters, cetyl esters, 2-ethylhexyl esters, 2-hexyldecyl esters, stearyl esters and the like.

More specific examples of the (a-2) silylated peptide include, for example, N-[2-hydroxy-3-(3-trihydroxysilyl)propoxyl]propyl-hydrolyzed proteins, N-[2-hydroxy-3-(3-dihydroxymethylsilyl)propoxyl]propyl-hydrolyzed proteins and the like.

The (a-2) silylated peptide in the cosmetic of the present invention may be a commercially available product. These include, for example, "Promois S-700SIG", "Promois W-52SIG", "Promois WS-HSIG" (all manufactured by Seiwa Kasei Co., Ltd.), among which "Promois S-700SIG" is preferably used. "Promois S-700SIG" is a product containing (dihydroxymethylsilylpropoxy)hydroxypropyl-hydrolyzed silk, 1,3-butylene glycol, methylparaben, propylparaben and water.

The blended amount of component (A) in the cosmetic of the present invention is not particularly limited, but should preferably be 0.08% to 2% by mass, more preferably 0.15% to 1.5% by mass relative to the total amount of the cosmetic in terms of pure component (A) content. If there is less than 0.08% by mass, then the ultraviolet protection performance improvement effects are not adequate, and if there is more than 2% by mass, then there is a tendency for stickiness to occur.

The (B) ultraviolet protectant (hereinafter sometimes referred to simply as "component (B)") blended into the cosmetic of the present invention refers to an ultraviolet absorbing agent and/or an ultraviolet scattering agent, and one that is normally blended into sunscreen cosmetics may be used.

Ultraviolet absorbing agents include, for example, benzoic acid derivatives, salicylic acid derivatives, cinnamic acid derivatives, dibenzoyl methane derivatives, β,β-diphenyl acrylate derivatives, benzophenone derivatives, benzylidene camphor derivatives, phenylbenzimidazole derivatives, triazine derivatives, phenylbenzotriazole derivatives, anthranil derivatives, imidazoline derivatives, benzalmalonate derivatives, 4,4-diaryl butadiene derivatives and the like. Hereinafter, specific examples and product names will be mentioned, but there is no limitation thereto.

Examples of benzoic acid derivatives include ethyl para-aminobenzoate (PABA), ethyl-dihydroxypropyl PABA, ethylhexyl-dimethyl PABA (e.g., "Escalol 5 Ethylhexyl P25"; BASF), diethylamino hydroxybenzoyl hexyl benzoate (e.g., "Uvinul A Plus") and the like.

Examples of salicylic acid derivatives include homosalate ("Eusolex HMS"; Rona/EM Industries), ethylhexyl salicylate or octyl salicylate (e.g., "Neo Heliopan OS"; Haarmann & Reimer), dipropylene glycol salicylate (e.g., "Dipsal"; Scher), TEA salicylate (e.g., "Neo Heliopan TS"; Haarmann & Reimer) and the like.

Examples of cinnamic acid derivatives include octyl methoxycinnamate or ethylhexyl methoxycinnamate (e.g., "Parsol MCX"; Hoffmann-La Roche), isopropyl methoxycinnamate, isoamyl methoxycinnamate (e.g., "Neo Heliopan E1000"; Haarmaan & Reimer), cinnoxate, DEA methoxycinnamate, diisopropyl methyl cinnamate, glyceryl ethylhexanoate dimethoxycinnamate, di-(2-ethylhexyl)-4'-methoxybenzalmalonate and the like.

Examples of dibenzoyl methane derivatives include 4-tert-butyl-4'-methoxy dibenzoyl methane (e.g., "Parsol 1789") and the like.

Examples of β,β-diphenyl acrylate derivatives include octocrylene (e.g., "Uvinul N539T"; BASF) and the like.

Examples of benzophenone derivatives include benzophenone-1 (e.g., "Uvinul 400"; BASF), benzophenone-2 (e.g., "Uvinul D50"; BASF), benzophenone-3 or oxybenzone (e.g. "Uvinul M40"; BASF), benzophenone-4 (e.g., "Uvinul MS40"; BASF), benzophenone-5, benzophenone-6 (e.g., "Helisorb 11"; Norquay), benzophenone-8 (e.g., "Spectra-Sorb UV-24"; American Cyanamid), benzophenone-9 (e.g., "Uvinul DS-49"; BASF), benzophenone-12 and the like.

Examples of benzylidene camphor derivatives include 3-benzylidene camphor (e.g., "Mexoryl SD"; Chimex), 4-methylbenzylidene camphor, benzylidene camphor sulfonic acid (e.g., "Mexoryl SL"; Chimex), camphor benzalkonium methosulfate (e.g., "Mexoryl SO"; Chimex), terephthalylidene dicamphor sulfonic acid (e.g., "Mexoryl SX"; Chimex), polyacrylamide methylbenzylidene camphor (e.g., "Mexoryl SW"; Chimex) and the like.

Examples of phenylbenzimidazole derivatives include phenylbenzimidazole sulfonic acid (e.g., "Eusolex 232";

Merck), disodium phenyldibenzimidazole tetrasulfonate (e.g., "Neo Heliopan AP"; Haarmann & Reimer) and the like.

Examples of triazine derivatives include bis-ethylhexyloxyphenol methoxyphenyl triazine (e.g., "Tinosorb S"; Ciba Specialty Chemicals), ethylhexyl triazone (e.g., "Uvinul T150"; BASF), diethylhexyl butamido triazone (e.g., "Uvasorb HEB"; Sigma 3V), 2,4,6-tris(diisobutyl-4'-aminobenzalmalonate)-s-triazine, 2,4,6-tris[4-(2-ethylhexyloxycarbonyl)anilino]-1,3,5-triazine and the like.

Examples of phenylbenzotriazole derivatives include drometrizole trisiloxane (e.g., "Silatrizole"; Rhodia Chimie), methylene bis(benzotriazolyl tetramethylbutyl phenol) (e.g., "Tinosorb M" (Ciba Specialty Chemicals)) and the like.

Examples of anthranil derivatives include menthyl anthranilate (e.g., "Neo Heliopan MA"; Haarmann & Reimer) and the like.

Examples of imidazoline derivatives include ethylhexyl dimethoxybenzylidene dioxoimidazoline propionate and the like.

Examples of benzalmalonate derivatives include polyorganosiloxanes having benzalmalonate functional groups (e.g., Polysilicone-15; "Parsol SLX"; DSM Nutrition Japan) and the like.

Examples of 4,4-diarylbutadiene derivatives include 1,1-dicarboxy (2,2'-dimethylpropyl)-4,4-diphenylbutadiene and the like.

The ultraviolet scattering agent used in the present invention is not particularly limited, but specific examples include fine-particle metal oxides including, for example, zinc oxide, titanium oxide, iron oxide, cerium oxide, tungsten oxide and the like.

The ultraviolet scattering agent may be non-surface-treated or subjected to various types of hydrophobic surface treatments, but those that are hydrophobically surface-treated are preferably used. The surface treatment agent is not particularly limited, and one that is commonly used in the cosmetic field, for example, a silicone such as dimethicone or alkyl-modified silicone, an alkoxysilane such as octyltriethoxysilane, a dextrin fatty acid ester such as dextrin palmitate, or a fatty acid such as stearic acid may be used.

The present invention includes embodiments in which component (B) consists only of an ultraviolet absorbing agent, embodiments in which it consists only of an ultraviolet scattering agent, and embodiments in which it includes both an ultraviolet absorbing agent and an ultraviolet scattering agent.

The blended amount of component (B) in the cosmetic of the present invention is not particularly limited, but should preferably be 5% to 40% by mass, more preferably 10% to 30% by mass, and even more preferably 10% to 20% by mass relative to the total amount of the cosmetic. If the blended amount of component (B) is less than 5% by mass, then sufficient ultraviolet protection effects are difficult to obtain, and even if more than 40% by mass is blended, an increase in the ultraviolet protection effects commensurate with the blended amount cannot be expected, and there are cases in which the emulsion stability becomes worse.

The cosmetic of the present invention, which has these features, has the property wherein the ultraviolet protection effects (absorbance) increase upon coming into contact with moisture. The expression "the ultraviolet protection effects (absorbance) increase upon coming into contact with moisture" can be defined basically as follows. A prescribed amount of a sample of the emulsion cosmetic is dripped onto a measurement plate, coated over a prescribed area and dried to form a coating film. The absorbance of the coating film is measured by means of a spectrophotometer or the like, and an absorbance integral value ($Abs^{before}$) of the coating film (before a water bath) is determined with reference to the absorbance of a coating film of a substance (such as glycerin) that does not absorb ultraviolet rays.

Next, the measurement plate on which the coating film has been formed is immersed in water under prescribed conditions, then dried, after which the absorbance integral value ($Abs^{after}$) of the coating film (after the water bath) is similarly measured.

The rate of change of the absorbance integral value (Abs change rate) before and after the water bath is computed from the following equation.

$$\text{Abs change rate}(\%) = [(Abs^{after})/(Abs^{before})] \times 100$$

Cases in which the Abs change rate exceeds 100% are defined as those in which the ultraviolet protection effect has increased.

In the cosmetic of the present invention, the Abs change rate at least exceeds 100%, and is preferably 105% or higher, more preferably 110% or higher, even more preferably 115% or higher, and particularly preferably 120% or higher.

In addition to components (A) and (B), a (C) oil phase thickener (hereinafter, sometimes referred to simply as "component (C)") may be blended into the cosmetic of the present invention in order to further increase the ultraviolet protection effects. By blending the component (C), the ultraviolet protection performance due to component (A) in the present invention is synergistically increased.

Component (C) used in the cosmetic of the present invention is not particularly limited, but may be selected, as appropriate, from among substances that are used as components for achieving an effect of thickening the oil phase by being dissolved into oils or by being swollen with oils in the emulsion cosmetic or the like. Specific examples include dextrin fatty acid esters such as dextrin palmitate, dextrin myristate or the like; sucrose fatty acid esters such as sucrose caprylic acid esters; higher fatty acids having 8 to 22 carbon atoms that are solid at ambient temperature, such as lauric acid, myristic acid, palmitic acid and stearic acid, or salts thereof; and organically modified clay minerals such as disteardimonium hectorite, benzyldimethylstearylammonium hectorite. Among these, it is preferable to use one or a combination of two or more of organically modified clay minerals, dextrin fatty acid esters and sucrose fatty acid esters.

The blended amount of component (C) in the cosmetic of the present invention is not particularly limited, but should preferably be 0.1% to 3% by mass, and more preferably 0.3% to 1% by mass relative to the total amount of the cosmetic. As the blended amount of component (C) becomes higher, stickiness tends to occur.

Aside from the above-mentioned components, the cosmetic of the present invention contains water and oils that constitute water-in-oil emulsion skin cosmetics, and a surfactant (emulsifier) may be blended therein as needed.

The surfactant used in the cosmetic of the present invention is not particularly limited as long as it is one that is normally used in water-in-oil emulsion cosmetics. However, for the purposes of the feeling in use, a surfactant having a silicone backbone (polysiloxane structure) and with an HLB lower than 8 is preferred. For example, a polyether-modified silicone, a polyether/alkyl-comodified silicone, a polyglycerin-modified silicone and/or a polyglycerin/alkyl-comodified silicone is preferably used, among which polyether-modified silicones and polyether/alkyl-modified silicones are more preferable.

The blended amount of the surfactant is not particularly limited, but should preferably be 0.1% to 10% by mass, and more preferably 0.5% to 5% by mass relative to the total amount of the cosmetic.

The oils used in the cosmetic of the present invention are not particularly limited and include, for example, liquid oils such as avocado oil, camellia oil, macadamia nut oil, mink oil, olive oil, castor oil, jojoba oil, triglycerin and glycerin trioctanoate; hydrocarbon oils such as liquid paraffin, squalane, paraffin, ceresin and squalene; higher fatty acids such as lauric acid, myristic acid, palmitic acid, stearic acid, behenic acid, oleic acid, 12-hydroxystearic acid, isostearic acid, linolic acid and linoleic acid; higher alcohols such as lauryl alcohol, cetyl alcohol, stearyl alcohol, behenyl alcohol, oleyl alcohol, monostearyl glycerol ether, monopalmityl glycerol ether, cholesterol, phytosterol and isostearyl alcohol; ester oils such as isononyl isononanoate, isopropyl myristate, cetyl octanoate, octyldodecyl myristate, butyl stearate, decyl oleate, ethylene glycol dioctanoate, diisostearyl malate, trimethylolpropane trioctanoate, trimethylolpropane triisostearate, pentaerythritol tetraoctanoate, glycerin trioctanoate, glycerin triisostearate ethyl acetate, butyl acetate and amyl acetate; linear silicone oils such as dimethyl polysiloxane, methyl phenyl polysiloxane, methylhydrogen polysiloxane and diphenyl siloxyphenyl trimethicone; and cyclic silicone oils such as decamethyl cyclopentasiloxane, dodecamethyl cyclohexasiloxane and octamethyl cyclotetrasiloxane. It is possible to use one or a combination of two or more of the above. The oil is preferably a silicone oil for the purposes of the feeling in use.

The blended amount of the oils is not particularly limited, but should preferably be 10% to 70% by mass, more preferably 15% to 70% by mass, and even more preferably 20% to 70% by mass relative to the total amount of the cosmetic. By including an oil within said range, the spreadability becomes good, and the water resistance and the feeling in use are excellent.

The water used in the cosmetic of the present invention is preferably ion-exchanged water or purified water. The water content may be decided as appropriate, but should preferably be 1% to 30% by mass relative to the total amount of the cosmetic.

In addition to the above-mentioned components, components that are normally used in cosmetic products, for example, humectants, film forming agents, water phase thickeners, alcohols, chelating agents, colorants, pigments, pearlescent agents, oxidation prevention agents (antioxidants), fragrances, various types of medicinal components, preservatives and the like may be appropriately blended, as needed, into the cosmetic of the present invention.

The cosmetic of the present invention may be produced in accordance with a method that is conventionally used to produce water-in-oil emulsions. For example, the water-in-oil emulsion skin cosmetic of the present invention may be obtained by separately preparing the water phase components and the oil phase components, then mixing the water phase and the oil phase, and emulsifying with a homomixer or the like.

The specific format of the cosmetic of the present invention is not particularly limited, but it may be a toner, a milky lotion, a cream, a lotion, a spray or the like with sunscreen effects that increase after being bathed in water. The cosmetic of the present invention may be produced by using a conventional method suitable for each format.

EXAMPLES

Although the present invention will be explained in further detail by providing examples below, the present invention is not limited in any way thereby. Where not otherwise noted, the blended amounts are indicated in percentage by mass relative to the total amount of the cosmetic. Before specifically explaining each example, the evaluation methods that were employed will be explained.

<Ultraviolet Protection Performance Increase Effect>

Cosmetics (samples) of each example were dripped, at a rate of 2 mg/cm$^2$, onto measurement plates (S plates) (5×5 cm V-groove PMMA plates, SPFMASTER-PA01), spread with a finger for 60 seconds and dried for 15 minutes to form coating films. The absorbances of the coating films were measured with a Hitachi U-3500 self-recording spectrophotometer. Using glycerin, which does not absorb ultraviolet rays, as a control, the absorbances (Abs) were computed by using the equation below and the measurement values from 280 nm to 400 nm were integrated to determine absorbance integral values.

$$Abs=-\log(T/T_0)$$

T: transmittance of sample, To: transmittance of glycerin

The measured plates were fully immersed in water having a hardness of 50 to 500, then stirred (at 300 rpm with a 3-1 motor) for 30 minutes while remaining in the water. Thereafter, the plates were dried for approximately 15 to 30 minutes until the water droplets on the surfaces disappeared, the absorbances were measured again, and the absorbance integral values were determined in a manner similar to the above.

Next, the Abs change rates (equation below) were computed from the Abs integral values before and after the water bath and used as indicators for the ultraviolet protection performance increase effect.

Ultraviolet Protection Increase Effect:

$$\text{Abs change rate}(\%)=[(Abs^{after})/(Abs^{before})]\times 100$$

<Feeling in Use>

Each sample was actually used by ten expert panelists, and four-level organoleptic evaluations were performed regarding the feeling in use (lack of stickiness) in accordance with the evaluation criteria below.

[Evaluation Criteria]
A: Much less sticky than control.
B: Less sticky than control.
C: Same stickiness as control.
D: More sticky than control.

Examples 1 and 2, and Comparative Example 1

Water-in-oil emulsion skin cosmetics having the compositions described in Table 1 below were prepared in accordance with conventional methods. The ultraviolet protection performance increase effects were evaluated in accordance with the above-mentioned evaluation method. The results thereof are also shown in the table.

TABLE 1

| Components (% by mass) | Comp. Ex. 1 | Ex. 1 | Ex. 2 |
|---|---|---|---|
| Water | bal | bal | bal |

TABLE 1-continued

| Components (% by mass) | | Comp. Ex. 1 | Ex. 1 | Ex. 2 |
|---|---|---|---|---|
| | Ethanol | 10 | 10 | 10 |
| | Glycerin | 1 | 1 | 1 |
| A | Polysilicone-29 15% aqueous solution | — | 1 | — |
| A | (Dihydroxymethylsilylpropoxy) hydroxypropyl-hydrolyzed silk 20% aqueous solution | — | — | 1 |
| | PEG-9 polydimethyl siloxyethyl dimethicone | 2 | 2 | 2 |
| | Isostearic acid | 0.5 | 0.5 | 0.5 |
| | Diisopropyl sebacate | 1 | 1 | 1 |
| | Dimethicone | 22.75 | 22.75 | 22.75 |
| | Isopropyl myristate | 5 | 5 | 5 |
| | Isododecane | 3 | 3 | 3 |

TABLE 1-continued

| Components (% by mass) | | Comp. Ex. 1 | Ex. 1 | Ex. 2 |
|---|---|---|---|---|
| B | Octocrylene | 3 | 3 | 3 |
| B | bis-Ethylhexyloxyphenol methoxyphenyl triazine | 1 | 1 | 1 |
| B | Diethylamino hydroxybenzoyl hexyl benzoate | 1 | 1 | 1 |
| B | Ethylhexyl methoxycinnamate | 7 | 7 | 7 |
| B | Hydrophobically treated titanium oxide | 3 | 3 | 3 |
| B | Hydrophobically treated zinc oxide | 10 | 10 | 10 |
| | Silicone-treated talc | 10 | 10 | 10 |
| | Methyl methacrylate crosspolymer | 5 | 5 | 5 |
| | Total | 100 | 100 | 100 |
| | Ultraviolet protection performance increase effects (%) | 88% | 110% | 108% |

As indicated in Table 1 above, in the case in which component (A) in the present invention is not blended into a cosmetic in which an oil phase thickener is not blended (Comparative Example 1), the water bath lowered the ultraviolet protection effects, whereas the ultraviolet protection performance after the water bath was significantly improved in the case in which component (A) of the present invention was blended (Examples 1 and 2).

Examples 3 to 6 and Comparative Example 2

Water-in-oil emulsion skin cosmetics having the compositions described in Table 2 below were prepared in accordance with conventional methods. The ultraviolet protection performance increase effects and the feeling in use were evaluated in accordance with the above-mentioned evaluation methods. When evaluating the feeling in use, Comparative Example 2 was used as the control. The results thereof are also shown in the table.

TABLE 2

| Components (% by mass) | | Comp. Ex. 2 | Ex. 3 | Ex. 4 | Ex. 5 | Ex. 6 |
|---|---|---|---|---|---|---|
| | Water | bal | bal | bal | bal | bal |
| | Ethanol | 10 | 10 | 10 | 10 | 10 |
| | Glycerin | 1 | 1 | 1 | 1 | 1 |
| A | Polysilicone-29 15% aqueous solution | — | 1 | 5 | 10 | — |
| A | (Dihydroxymethylsilylpropoxy)hydroxypropyl hydrolyzed silk 20% aqueous solution | — | — | — | — | 1 |
| C | Disteardimonium hectorite | 0.3 | 0.3 | 0.3 | 0.3 | 0.3 |
| | PEG-9 polydimethyl siloxyethyl dimethicone | 1.5 | 1.5 | 1.5 | 1.5 | 1.5 |
| | Isostearic acid | 0.45 | 0.45 | 0.45 | 0.45 | 0.45 |
| | Diisopropyl sebacate | 1 | 1 | 1 | 1 | 1 |
| | Dimethicone | 26.5 | 26.5 | 26.5 | 26.5 | 26.5 |
| | Isopropyl myristate | 5 | 5 | 5 | 5 | 5 |
| | Isododecane | 3 | 3 | 3 | 3 | 3 |
| B | Octocrylene | 3 | 3 | 3 | 3 | 3 |
| B | bis-Ethylhexyloxyphenol methoxyphenyl triazine | 0.5 | 0.5 | 0.5 | 0.5 | 0.5 |
| B | Diethylamino hydroxybenzoyl hexyl benzoate | 1.5 | 1.5 | 1.5 | 1.5 | 1.5 |
| B | Ethylhexyl methoxycinnamate | 7.5 | 7.5 | 7.5 | 7.5 | 7.5 |
| B | Hydrophobically treated titanium oxide | 2 | 2 | 2 | 2 | 2 |
| B | Hydrophobically treated zinc oxide | 11 | 11 | 11 | 11 | 11 |
| | Hydrophobically treated talc | 8 | 8 | 8 | 8 | 8 |
| | Methyl methacrylate crosspolymer | 5.5 | 5.5 | 5.5 | 5.5 | 5.5 |
| | Total | 100 | 100 | 100 | 100 | 100 |
| | Ultraviolet protection performance increase effects (%) | 104% | 130% | 115% | 105% | 112% |
| | Feeling in use | C | A | B | B | B |

As indicated in Table 2 above, disteardimonium hectorite, which is mentioned as a component providing effects of increasing the ultraviolet protection performance after a water bath in Patent Document 1, is blended into Comparative Example 2 (control), which thus has ultraviolet protection performance increase effects after the water bath. However, in the cases in which component (A) of the present invention was blended and disteardimonium hectorite was further added (Examples 3 to 6), the ultraviolet protection performance increase effects after the water bath increased even more than those in Comparative Example 2. In addition thereto, the stickiness was suppressed in comparison with Comparative Example 2, thus providing an extremely good feeling in use.

Example 7 and Comparative Example 3

Water-in-oil emulsion skin cosmetics having the compositions described in Table 3 below were prepared in accordance with conventional methods. The ultraviolet protection performance increase effects were evaluated in accordance with the above-mentioned evaluation method. The results thereof are also shown in the table.

TABLE 3

| | Components (% by mass) | Comp. Ex. 3 | Ex. 1 | Ex. 7 |
|---|---|---|---|---|
| | Water | bal | bal | bal |
| | Ethanol | 10 | 10 | 10 |
| | Glycerin | 1 | 1 | 1 |
| A | Polysilicone-29 15% aqueous solution | — | 1 | 1 |
| C | Disteardimonium hectorite | 0.3 | — | 0.3 |
| C | Dextrin palmitate | 1 | — | 1 |
| | PEG-9 polydimethyl siloxyethyl dimethicone | 2 | 2 | 2 |
| | Isostearic acid | 0.5 | 0.5 | 0.5 |
| | Diisopropyl sebacate | 1 | 1 | 1 |
| | Dimethicone | 23.75 | 22.75 | 22.75 |
| | Isopropyl myristate | 5 | 5 | 5 |
| | Isododecane | 3 | 3 | 3 |
| B | Octocrylene | 3 | 3 | 3 |
| B | bis-Ethylhexyloxyphenol methoxyphenyl triazine | 1 | 1 | 1 |
| B | Diethylamino hydroxybenzoyl hexyl benzoate | 1 | 1 | 1 |
| B | Ethylhexyl methoxycinnamate | 7 | 7 | 7 |
| B | Hydrophobically treated titanium oxide | 3 | 3 | 3 |
| B | Hydrophobically treated zinc oxide | 10 | 10 | 10 |
| | Silicone-treated talc | 10 | 10 | 10 |
| | Methyl methacrylate crosspolymer | 5 | 5 | 5 |
| | Total | 100 | 100 | 100 |
| | Ultraviolet protection performance increase effects (%) | 105% | 110% | 128% |

The ultraviolet protection performance increase effects after the water bath in the case in which component (A) of the present invention was blended in combination with an oil phase thickener (component (C)) (Example 7) were compared with those for the cases in which only component (A) of the present invention was included (Example 1) and the case in which only component (C) was included (Comparative Example 3). The results indicated in Table 3 clearly supported that the rise in the ultraviolet protection performance increase effects after the water bath due to combining component (A) and component (C) were synergistic.

The invention claimed is:

1. A water-in-oil emulsion skin cosmetic comprising:
   (A) at least one compound selected from among (a-1) copolymers having silanol groups, and oxypropylene groups (PO) or oxyethylene groups (EO), and (a-2) silylated peptides; and
   (B) an ultraviolet protectant,
   wherein the (a-1) copolymer includes a polysiloxane structure and a polyoxyalkylene structure on a main chain, and has a side chain with trialkoxysilane groups or silanol groups, and
   wherein the (a-2) silylated peptide is an N-[2-hydroxy-3-(3-trihydroxysilyl)propoxy]propyl-hydrolyzed protein or an N-[2-hydroxy-3-(3-dihydroxymethylsilyl)propoxy]propyl-hydrolyzed protein.

2. The water-in-oil emulsion skin cosmetic according to claim 1, wherein the blended amount of component (A) is 0.08% to 2% by mass.

3. The water-in-oil emulsion skin cosmetic according to claim 1, further comprising (C) an oil phase thickener.

* * * * *